(12) United States Patent
Berman et al.

(10) Patent No.: US 8,319,956 B2
(45) Date of Patent: Nov. 27, 2012

(54) SYSTEM AND METHOD FOR SHADE SELECTION USING A FABRIC BRIGHTNESS FACTOR

(75) Inventors: Joel Berman, Hewlett, NY (US); Jan Berman, Wilton, CT (US); Muthukumar Ramalingam, Phoenix, AZ (US)

(73) Assignee: MechoShade Systems, Inc., Long Island City, NY (US)

( * ) Notice: Subject to any disclaimer, the term of this patent is extended or adjusted under 35 U.S.C. 154(b) by 382 days.

(21) Appl. No.: 12/710,054

(22) Filed: Feb. 22, 2010

(65) Prior Publication Data

US 2010/0157427 A1    Jun. 24, 2010

Related U.S. Application Data

(63) Continuation-in-part of application No. 11/539,559, filed on Oct. 6, 2006, now Pat. No. 7,684,022.

(60) Provisional application No. 60/804,694, filed on Jun. 14, 2006.

(51) Int. Cl.
*G01N 21/47* (2006.01)
(52) U.S. Cl. ............. 356/73; 356/446; 356/448
(58) Field of Classification Search .......... 356/73, 356/402, 408, 432, 445, 448, 446; 442/59, 442/132

See application file for complete search history.

(56) References Cited

U.S. PATENT DOCUMENTS

| | | |
|---|---|---|
| 2,464,623 A | 3/1949 | Vogel |
| 3,042,001 A | 7/1962 | Dubie |
| 3,294,152 A | 12/1966 | Kuijvenhoven |
| 3,675,023 A | 7/1972 | Kunke et al. |
| 3,696,845 A | 10/1972 | Acker et al. |
| 3,710,597 A | 1/1973 | Schmidt |
| 3,860,055 A | 1/1975 | Wild |
| 3,965,348 A | 6/1976 | Anetseder, Sr. et al. |
| 4,029,420 A * | 6/1977 | Simms .................. 356/446 |
| 4,103,177 A * | 7/1978 | Sanford et al. ........ 250/559.03 |
| 4,364,662 A * | 12/1982 | Yuasa et al. ............ 356/225 |
| 4,377,195 A | 3/1983 | Weil |
| 4,397,346 A | 8/1983 | Chumbley et al. |
| 4,610,294 A | 9/1986 | Anesi et al. |
| 4,622,470 A | 11/1986 | Makino et al. |
| 4,698,276 A | 10/1987 | Duval |

(Continued)

FOREIGN PATENT DOCUMENTS

DE    4023673    6/1992

(Continued)

OTHER PUBLICATIONS

Examination Report dated Jul. 21, 2009 for GB0804163.4.

(Continued)

*Primary Examiner* — Layla Lauchman
(74) *Attorney, Agent, or Firm* — Snell & Wilmer L.L.P.

(57) ABSTRACT

Brightness factors associated with shade fabric may be utilized when shading a building. A brightness factor may incorporate an openness factor, a visible light reflectance, a diffusion factor, a color, or other characteristics of the shade fabric. The brightness factor may be utilized when selecting a particular shade fabric for a room, building or other location. Additionally, the brightness factor may be utilized by an automated shade control system. The shade fabric selection may affect the building envelope by facilitating the optimization of daylighting, reduction of artificial electric lighting needs, minimization of glare conditions, and reduction of thermal load.

24 Claims, 7 Drawing Sheets

U.S. PATENT DOCUMENTS

| | | | |
|---|---|---|---|
| 4,712,104 A | 12/1987 | Kobayashi | |
| 4,727,918 A | 3/1988 | Schroeder | |
| 4,864,201 A | 9/1989 | Bernot | |
| 4,915,763 A | 4/1990 | Swiszcz | |
| 4,979,550 A | 12/1990 | Long et al. | |
| 5,063,984 A | 11/1991 | Cherveny | |
| 5,142,133 A | 8/1992 | Kern et al. | |
| 5,205,333 A | 4/1993 | Judkins | |
| 5,371,447 A | 12/1994 | Boss | |
| 5,532,560 A | 7/1996 | Element et al. | |
| 5,566,471 A | 10/1996 | Hirano | |
| 5,598,000 A | 1/1997 | Popat | |
| 5,648,656 A | 7/1997 | Begemann et al. | |
| 5,655,585 A | 8/1997 | Fry | |
| 5,662,147 A | 9/1997 | Haiber | |
| 5,663,621 A | 9/1997 | Popat | |
| 5,675,487 A | 10/1997 | Patterson et al. | |
| 5,793,174 A | 8/1998 | Kovach et al. | |
| 6,024,156 A | 2/2000 | Chu | |
| 6,084,231 A | 7/2000 | Popat | |
| 6,103,345 A | 8/2000 | Oshima et al. | |
| 6,307,331 B1 | 10/2001 | Bonasia et al. | |
| 7,085,627 B2 | 8/2006 | Bamberger et al. | |
| 7,190,461 B2 * | 3/2007 | Han et al. | 356/446 |
| 2005/0110416 A1 | 5/2005 | Veskovic | |
| 2005/0215147 A1 | 9/2005 | Masters et al. | |
| 2006/0185799 A1 | 8/2006 | Kates | |
| 2007/0187042 A1 | 8/2007 | Kallstrom | |
| 2007/0248246 A1 | 10/2007 | Cherkassky et al. | |
| 2008/0115425 A1 | 5/2008 | Forbis et al. | |
| 2010/0091272 A1 * | 4/2010 | Asada et al. | 356/237.2 |

FOREIGN PATENT DOCUMENTS

| | | |
|---|---|---|
| JP | 01219283 | 9/1989 |
| JP | 03017381 | 1/1991 |
| JP | 04044589 | 2/1992 |
| JP | 2000054762 | 2/2000 |
| JP | 2001295154 | 10/2001 |
| WO | WO 92/00557 | 1/1992 |
| WO | WO 2007/006775 | 1/2007 |

OTHER PUBLICATIONS

Search and Examination Report dated Dec. 18, 2009 for GB0920586.5.

Search and Examination Report dated Dec. 18, 2009 for GB0920589.9.

Search and Examination Report dated Dec. 18, 2009 for GB0920602.0.

Notice of Allowance dated Feb. 1, 2010 for International Application No. 08910792CA.

Office Action dated Jul. 30, 2009 for International Application No. 08910792CA.

Office Action dated Mar. 16, 2009 for U.S. Appl. No. 11/539,559.

Office Action dated Sep. 14, 2009 for U.S. Appl. No. 11/539,559.

Notice of Allowance dated Nov. 9, 2009 for U.S. Appl. No. 11/539,559.

Office Action dated Apr. 21, 2008 for U.S. Appl. No. 11/162,377.

Office Action dated May 22, 2008 for U.S. Appl. No. 11/162,377.

Notice of Allowance dated Jul. 11, 2008 for U.S. Appl. No. 11/162,377.

ISR & WO dated Aug. 10, 2009 for International Patent Application No. PCT/US2009/48387.

ISR & WO dated Apr. 24, 2008 for International Patent Application No. PCT/US2006/032874.

IPRP dated Apr. 16, 2009 for International Patent Application No. PCT/US2006/032874.

Search and Examination Report dated Dec. 18, 2009 for GB0804163.4.

* cited by examiner

| Fabric ID | Name | Munsell color number | Brightness Factor |
|---|---|---|---|
| Fabric 11 | White/White | 5P 5/8 | 71 |
| Fabric 14 | White/Fawn | 4Y 6/7 | 78 |
| Fabric 9 | Grey | 4PB 7/5 | 82 |
| Fabric 84 | Olive | 4G 6/4 | 96 |
| Fabric 17 | Porcelain | 6Y 3/10 | 102 |
| Fabric 5 | Mushroom | 3R 2/5 | 108 |

FIG. 6

SYSTEM AND METHOD FOR SHADE SELECTION USING A FABRIC BRIGHTNESS FACTOR

CROSS REFERENCE TO RELATED APPLICATIONS

This application is a continuation-in-part of U.S. Ser. No. 11/539,559 filed Oct. 6, 2006, now U.S. Pat. No. 7,684,022 entitled "SYSTEM AND METHOD FOR SHADE SELECTION USING A FABRIC BRIGHTNESS FACTOR." U.S. Ser. No. 11/539,559 is a nonprovisional of U.S. Provisional No. 60/804,694 filed Jun. 14, 2006 and entitled "SYSTEM AND METHOD FOR SHADE SELECTION USING A FABRIC BRIGHTNESS FACTOR." The entire contents of all of the foregoing applications are hereby incorporated by reference.

FIELD

The present disclosure generally relates to selection of a fabric for a window shade, and more particularly, to the use of a brightness factor for selecting a fabric for a window shade.

BACKGROUND OF THE INVENTION

Incorporating a suitable window shade over a window can make a substantial difference in the aesthetics, comfort and energy savings in an enclosed space. In that regard, window shades are often utilized for a variety of purposes, for example maximizing a view, maximizing daylight, blacking out a room, minimizing brightness, adjusting to climatic variables and sky conditions, minimizing heat at certain times of the year, maximizing heat during other times of the year, protecting work surfaces, minimizing glare, protecting people from direct sun, and/or the like.

When choosing the appropriate window shade system, lighting designers and interior architects typically consider various factors, for example glazing (glass) properties, room properties and environmental conditions. The glass properties may include total solar and visible properties (e.g., transmission, reflection, absorption, and/or the like), single or multiple pane glass, chemicals or materials between the panes of glass, angled glass, tint, sun screens, ultraviolet (UV) transmission, bars over the windows, frosted glass, and/or the like. The room properties may include the interior lighting and the reflectance from the wall, floor and ceiling. The environmental conditions may include typical solar or climate conditions (e.g., often cloudy skies in Seattle, often clear skies in Phoenix, etc.), obstructions (mountains, trees, other buildings, and/or the like), luminance (the amount of light leaving a point on a surface in a given direction (e.g., that comes to the eye from a surface)) and illuminance (the amount of visible light on a surface from all directions above that surface or the density of luminous flux incident on a surface). Luminance may be measured in foot-lamberts, candala per square meter, nits, lambert, or any other suitable unit. Illuminance may be measured in lux, foot-candles, lumens per square meter, or any other suitable unit. The impact of a window shade system on a particular room may also be calculated under various conditions. For example, measurements may be obtained related to the luminance from the shade, walls and ceiling, the amount of light through the shade and glass, and/or the like.

In recent years, corporate and institutional building design has tended to include higher and higher visual light transmission glass for allowing more natural daylight into the building space, enhancing the view to the outside and using the daylight to reduce artificial lighting and A/C energy usage. Such increasing use of higher visual light transmission glass creates both problems and opportunities.

Since around the year 2000, designers have changed their selection of building glazings to low emissivity ("low E") clear glass, low iron glass (e.g., Starphire® brand glass), or a similar tinted low E glazing. Such glazings have higher ratio of visible light transmission (VLT) to Solar Heat Gain Factor (SHGF). Over the years, the VLT of double glazing has changed from a low of about 0.20 (e.g. low E Solarban® brand glass), to an uncoated bronze or gray heat absorbing glass of about 0.40 VLT, to low iron glass (e.g., green or blue aqua glass) with a VLT of about 0.6, and now to a low E clear glass (e.g., Starphire® brand) glass with a VLT of about 0.70 to about 0.75. The SHGF percentage of heat inside the glass with a low E coating has remained around 0.40 to about 0.55. In other words, the ratio of heat gain to VLT through the glass was previously close to a 1:1 ratio, but the ratio is now about 1:1.75, which is a dramatic increase of VLT over heat gain.

Based in part on the lower heat gain resulting from improved glass, HVAC systems have been downsized. However, certain HVAC systems have sometimes not been sufficiently adjusted for the substantial gain in VLT, which also has a strong direct solar radiant component.

Moreover, in an effort to reduce glare and limit the impact of transient adaptation of the eye as the eye goes from one area (the task) to another area (adjacent surroundings or surfaces), lighting designers have determined an appropriate ratio for the perceived and measured brightness inside a person's field of view. A person's field of view is generally considered to be about a 60 degree visual cone. As used herein, "adjacent" surfaces or surroundings are those within about a 30 degree visual cone. "Non-adjacent" or "remote" surfaces or surroundings are those within a visual cone from about 30 degrees to about 60 degrees. A common recommended ratio between a task and adjacent surroundings is about 3:1, a common recommended ratio between task and remote surroundings is about 10:1, and a common recommended ratio is about 40:1 for everything outside a 60 degree cone. These ratios are applicable for areas on the order of one steradian, so higher ratios may be recommended in small areas to add visual interest.

To provide an example of commonly recommended ratios, if a work surface has 50 foot-candles (FC) of illuminance, then the visual zone should not have any glare or brightness that exceeds a 10:1 ratio within remote surroundings, in other words not to exceed about 500 FC. In another example, in the case of a computer screen, if the lumen output of the screen is 200 candela per square meter ($cd/m^2$), then the maximum amount of brightness in the person's field of view should not be more than 2000 $cd/m^2$ within remote surroundings.

As the VLT of the glass increases, and as lighting designers attempt to control the brightness inside a person's field of view, the shade cloth color on the outside and/or inside of a building also has an effect on the building design, along with the uniformity and alignment of the window covering. As such, the impact of the window covering is now becoming an integral element in building design.

To calculate the heat flow through glass by convection and direct radiation, an ASHRAE (American Society of Heating, Refrigerating and Air-Conditioning Engineers) formula using the solar optical properties of the fabric may be used to calculate SHGF of the glass, along with the glass and shade combination. Commonly available performance data for a screen fabric are Total Solar Reflectance (TSr); Total Solar Transmission (TSt); and Total Solar Absorbtion (TSa), wherein the total of TSr+TSt+TSa=100%. Other performance data for a screen fabric may include Visible Light Transmission (VLT); UV Transmission (UVT), and Openness Factor (OF) (a factor which is related to the closeness of the weave of the fabric). However, VLT, UVT, and OF are not included in the ASHRAE formula, as they are not components of the total solar measurements used above to develop the SHGF. The SHGF provides information useful for calculating heat flow into a building to enable mechanical engineers to more effectively size the HVAC systems.

However, the SHGF does not address the comfort factors of direct solar radiation, or visual brightness near the window wall (for example, up to about 15-20 feet from the window wall). The engineering standards of the shading coefficient, solar heat gain factor, or solar factor generally do not include a valuation of comfort at the window wall for an occupant. As such, tests were conducted to determine the factors that affect personal comfort near a window wall with sun screens. The tests matched different types and kinds of glass with a variety of woven sun screen fabrics, and measured the total heat gain, solar radiation, heat gain and visible light transmission. The tests resulted in a method for determining a screen cloth's "personal comfort value" under reasonable interior environmental conditions with glazing of a specific VLT and/or SHGF.

While various factors, tests and calculations exist for determining an optimum window system, the SHGF and the personal comfort values still do not include the relative brightness (illuminance) of the fabric when it is solar lit, its effect on the interior environment and its impact on the viewers. A strong need exists to compare the surface brightness of different fabrics with a uniform light source to determine the relative brightness of one screen fabric to another screen fabric. A strong need also exists to determine the illuminance or brightness factor of a screen such that the brightness factor can help determine a suitable window shade fabric for a particular room, building or other enclosure.

SUMMARY OF THE INVENTION

In an exemplary embodiment, a method comprises determining, by a computer for determining an estimated brightness factor for a fabric, an estimated openness factor of the fabric based on a Munsell chroma of the fabric; determining, by the computer, an estimated visible light reflectance of the fabric based on a Munsell value of the fabric; determining, by the computer, an estimated diffusion factor of the fabric based on a Munsell hue of the fabric; and determining, by the computer, the estimated brightness factor based upon the estimated openness factor, the estimated visible light reflectance, and the estimated diffusion factor.

In another exemplary embodiment, a method of shading a room comprises selecting a shade fabric for use in constructing a window covering. The shade fabric is selected based on a brightness factor of the shade fabric, and the brightness factor is determined by measuring an openness factor, a visible light reflectance, and a diffusion factor of the shade fabric. The method further comprises placing the window covering between a window and a light source, and moving the window covering to modify the brightness in the room.

In another exemplary embodiment, a method for thermal control of a building comprises providing a system configured to facilitate control of daylighting of an interior space of the building. The system is configured to utilize a proactive algorithm to generate a movement request configured to move a window covering. The method further comprises overriding the proactive algorithm responsive to thermal information associated with the window covering. The thermal information comprises least one of: an actual British thermal unit (BTU) load on a window associated with the window covering, or a calculated BTU load on the window associated with the window covering.

In another exemplary embodiment, a method comprises determining, by a computer for determining an estimated brightness factor for a fabric, an estimated openness factor of the fabric based on a first component of a color space associated with the color of the fabric; determining, by the computer, an estimated visible light reflectance of the fabric based on a second component of the color space; determining, by the computer, an estimated diffusion factor of the fabric based on a third component of the color space; and determining, by the computer, the estimated brightness factor based upon the estimated openness factor, the estimated visible light reflectance, and the estimated diffusion factor.

BRIEF DESCRIPTION OF THE DRAWING FIGURES

With reference to the following description, appended claims, and accompanying drawings, wherein like numerals designate like elements:

FIG. 6 illustrates an exemplary portion of a fabric selection guide incorporating a brightness factor in accordance with an exemplary embodiment.

DETAILED DESCRIPTION

Figure 1:
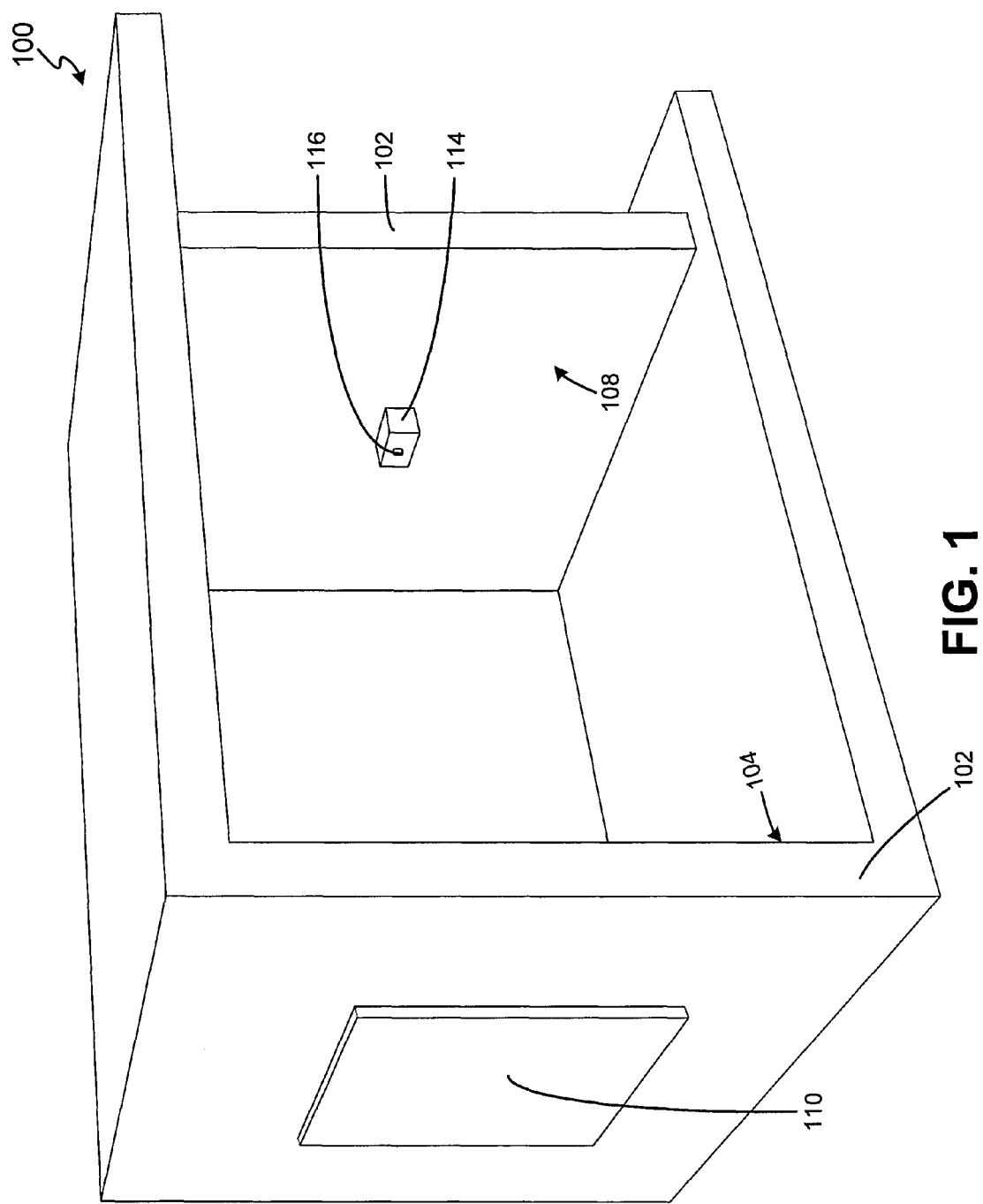
FIG. 1 illustrates an exemplary test chamber to facilitate testing and/or validation of one or more window coverings in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims. Thus, the detailed description herein is presented for purposes of illustration only and not of limitation. For example, the steps recited in any of the method or process descriptions may be executed in any order and are not limited to the order presented.

The present disclosure generally includes a system and method for determining the brightness factor of a fabric to help lighting designers, interior architects or other professionals to select a suitable fabric for a particular window, room, building or other location. The fabric selection may affect the building envelope, for example by facilitating the optimization of daylighting, the reduction of artificial electric lighting needs, and/or minimization of glare conditions. The brightness factor data of the present disclosure may be used by architects, designers, engineers and the like to select a suitable fabric based on desired interior function, light level, relative surface brightness, and/or any other desired interior lighting characteristic. The brightness factor may be important to the environment and energy efficiency. The brightness factor also provides benefits based on the changes in glazing and the requirements for more and improved energy efficient and sustainable designs.

While factors such as glazing properties, room properties, and environmental conditions may be relevant for selecting a window shade system, the selection of a window shade fabric may include different factors. An exemplary embodiment includes determining a brightness factor for a particular illuminated window shade fabric, wherein the brightness factor incorporates the openness factor (OF) of the fabric, visible light reflectance (VLR) of the fabric and visible light transmission (VLT) of the fabric. The selection of a suitable fabric for a particular project may include an evaluation of the fabric's solar optical properties, color, visible light transmission, visible light reflectance, and openness factor, along with other factors, for example a solar characteristic of the glass, an orientation of a window, and/or the like. The present disclosure includes a system and method configured to permit designers and engineers to look at the solar optical properties and characteristics of a screen fabric, along with the relative brightness of the screen fabric under given backlit conditions in relation to other screen fabrics backlit with the same amount of light. In other words, the present disclosure enables designers and engineers to conduct a direct comparison of screen cloth illuminance characteristics using a brightness factor.

In addition to comparing the illuminance of different fabrics under similar backlight conditions, the brightness factor is also a tool for the lighting designer. The lighting designer may combine a brightness factor with glazing data for a window to determine the amount of illuminance a given fabric will emit, and the related effect on interior illumination, daylighting and surface brightness. For comparison, a typical sky condition without direct sun is about 8,000-9,000 FC, and the sun is about 13,000 FC. In an exemplary embodiment, the brightness factor for certain shade fabrics ranges from about 0 FC to about 800 FC, and for roller shade fabrics considered in connection with different glazing systems, the brightness factor ranges from about 0 FC to about 250 FC.

The brightness factor can be applied to any screen fabric. Utilizing test data of the solar optical properties of a screen fabric, along with fabric construction factors, the standard illuminance of any screen fabric can be developed and compared to other screen fabrics. The brightness factor provides a relative brightness comparison of lighting output from the inner surface of a product (e.g., window shade), plus the illuminance data to determine an interior brightness level with different amounts of light and different types of glass. One skilled in the art will appreciate that the brightness factor and methods discussed herein may be used with any product or surface; however, the specific embodiment of a window shading system will be discussed herein in more detail.

The use of a brightness factor, along with other factors and systems discussed herein to optimize a window shade selection may enhance the visual comfort of occupants of a space. As used herein, the phrase "visual comfort" includes the absence, reduction, and/or minimization of physiological pain, irritation and/or distraction. Visual comfort within a space depends at least in part on the contrast levels and luminance variations across the space. For example, glare is one of the most common causes of visual discomfort, and can result in the occupant having to react to the existing lighting system. The reaction may include turning, moving, or otherwise adjusting the window covering. Surface brightness is an attribute of visual perception in which a surface appears to emit a given amount of light. Brightness is dependent upon the illuminance of a surface and upon the surface reflectivity. Perceived brightness is not linearly proportional to the reflectivity.

A process of developing and verifying a brightness factor may utilize many combinations of solar characteristics and formula in many trial and test combinations. For example, a brightness factor may be assessed under direct sunlight on the fabric. A brightness factor may also be assessed under diffuse light on the fabric. Additionally, one or more weighting factors may be coupled to each of the characteristics of the fabric in order to improve the accuracy and/or precision of the resulting calculated brightness factor. Stated another way, a particular component of a brightness factor, for example the openness factor, may be weighted to have a greater and/or lesser effect on a calculated brightness factor than another component, for example the visible light reflectance.

Moreover, various equations, formulas, and/or approaches for calculating a brightness factor are considered to be within the scope of the present disclosure.

In an exemplary embodiment, a formula for calculating a brightness factor (BF) of a fabric comprises:

$$BF=[(W1*OF)+(W2*VLR)+(W3*DF)]*1000 \text{ or}$$

$$BF=[(W1*OF)+(W2*VLR)+(W3*(VLT-OF))]*1000$$

of brightness or illuminance of the fabric, wherein:
 BF=the brightness factor of the fabric,
 VLR=Visual Light Reflectance to the interior (i.e., illumination coming from the room interior reflected off the fabric and returned to the interior),
 VLT=Visual Light Transmission (i.e., all rays passing through the fabric),
 OF=Openness factor (i.e., non-diffused rays passing through the fabric),
 DF=diffusion factor (i.e., VLT−OF), and
 W1, W2, and W3=weighting factors corresponding to the relative contribution of each of the respective components to the brightness factor.

In an exemplary embodiment, the foregoing formula for calculating a brightness factor utilizes a value for W1 of 22, a value for W2 of 1, and a value for W3 of 37. In various exemplary embodiments, the foregoing formula for calculating a brightness factor utilizes a value for W1 of between about 20 and about 24, a value for W2 of between about 0.9 and about 1.1, and a value for W3 of between about 33 and about 41. In this exemplary embodiment, the weighting factors W1, W2, and W3 are configured to account for fabrics which utilize substantially opaque fibers. In other exemplary embodiments, calculating a brightness factor for fabric utilizing a translucent and/or transparent fiber may result in a modification to one or more of W1, W2, or W3.

More particularly, the diffusion factor (DF) is related to the actual quantity of diffuse light transmission through the fabric material. The lower the DF, the higher the absorption and reflection of the fabric material. For example, a dark colored fabric will have very little transmitted diffuse light through the fabric material. While dark colors provide a better view through the shade to the outside, dark colors absorb light and heat and are less energy efficient than lighter colors. Dark colors transmit less light and have a lower surface brightness, which lowers reflectivity and provides better glare reduced environments, for example for cathode ray tubes, liquid crystal displays, plasma screens, and other emissive display technologies. In contrast, light colors are brighter when sunlit, which causes high surface brightness and may result in transmission of excessive, debilitating light to workstations. Light colors are more difficult to see through than dark colors due to surface brightness and higher reflectance and transmittance characteristics.

Moreover, light transmission through fabric during overcast sky conditions is much different than on clear sky conditions. The light from overcast conditions is similar to light through diffusing optical material, for example acrylic glass. As such, the light coming through open areas of the fabric under overcast sky conditions will still be diffuse, thereby limiting light penetration into the building compared to clear sky conditions.

In accordance with an exemplary embodiment, the openness factor (OF) is a shade fabric property, but is also a percentage of a measured visible light transmittance value. An openness factor of an illuminated window shade fabric may be calculated by placing the fabric over one end of a blackened tube, then placing a light meter at the other end of the blackened tube. A blackened tube eliminates or minimizes the effects of the transmittance of the fabric. The light meter measures the visible light through the fabric, for example in British Thermal Units (BTU) per hour per square foot, watt per square meter, or any other suitable units. The light meter then measures the direct visible light without the fabric in its path. The measurements are then compared to determine the reduction in visible light reaching the light meter due to the placement of the shade fabric. The reduction is considered the openness factor.

In an exemplary embodiment, a visibly transparent fabric may be configured with different degrees of openness corresponding to different openness factors. In other exemplary embodiments, a shade fabric may comprise a translucent fabric with zero or minimal openness, but including visible light reflectance and visible transmittance.

In various exemplary embodiments, use of an opaque yarn to construct a shade fabric results in a shade fabric having a visible light transmission which is similar to the openness factor. For example, a particular shade fabric constructed of an opaque yarn may have a visible light transmission of 3.1% and an openness factor of 3%. In other words, nearly all light (i.e., 3% divided by 3.1%=96.7% of the light) passing through the shade fabric is non-diffused light; viewed another way, for various shade fabrics having opaque yarns the ratio between the visible light transmission and the openness factor is about 1:1, or at most about 3:1.

In certain exemplary embodiments, use of a translucent and/or transparent yarn to construct a shade fabric results in a shade fabric having a visible light transmission which is larger than the openness factor. For example, a particular shade fabric constructed of a translucent yarn may have a visible light transmission of 30% and an openness factor of 2%. In other words, nearly all light (28% divided by 30%=93.3% of the light) passing through the shade fabric is diffused light; viewed another way, for various shade fabrics having translucent and/or transparent yarns the ratio between the visible light transmission and the openness factor may be as large as 30:1 or even higher.

In an exemplary embodiment, the visible light reflectance includes the reflection of internal light off of the inside (interior) surface of an illuminated window shade fabric. The visible light reflectance may be determined via any suitable method or technique. For example, in an exemplary embodiment, the visible light reflectance is determined by pointing a light meter at the fabric, then measuring the reflectance off of the fabric. Another measurement is obtained from measuring the direct visible light using the same light meter. The measurements are then compared to determine the reduction in visible light from the reflection off of the window shade fabric, which may be considered the visible light reflectance.

In certain exemplary embodiments, the visible light transmission includes the amount of light from outside solar radiation. The visible light transmission of an illuminated window shade fabric may be determined via any suitable method or technique. In an exemplary embodiment, the visible light transmission is determined by placing the fabric over one end of a tube, then placing a light meter at the other end of the tube. A blackened tube is not used when determining visible light transmission. The light meter measures the visible light through the fabric. The light meter then measures the direct visible light without the fabric in its path. The measurements are then compared to determine the reduction in visible light from the window shade fabric, which is considered the visible light transmission.

In an exemplary embodiment, the determination of a brightness factor of a shade fabric is independent of the glass and the solar conditions. However, a brightness factor may be used in conjunction with the glazing properties when choosing a suitable roller shade fabric. Moreover, in conjunction with a brightness factor, the visible light reflectance of the walls, floor, ceiling, furniture, art work, and/or other components of the room may be used to choose a shade fabric that is suitable for a particular project. For example, if the walls, ceiling, floors and furniture are bright and reflective, it may be desirable to choose a shade fabric with a lower brightness factor. Similarly, if the walls, ceiling, floors and furniture have a medium color value and low reflectance, it may be best to choose a shade fabric with a higher brightness factor.

In various exemplary embodiments, a brightness factor can facilitate a prediction, with other similar screen fabrics, of the approximate brightness of the fabric in cd/m2 with a specific light source behind the fabric, with or without a glazing. The overall brightness may then be adjusted with the glazing to be used. For example, in connection with a particular shade fabric having a particular brightness factor, a user may select a 60% visible light transmission glazing. In connection with another shade fabric having a different brightness factor, a user may select a 90% visible light transmission glazing, a 100% visible light transmission glazing, or other glazing in order to achieve a desired overall brightness.

A window shade or fabric manufacturer or distributor may publish information regarding solar and visible light optical proprieties of their fabrics, along with the brightness factor of each fabric and the resultant overall brightness (i.e., in $cd/m^2$, foot-candles, and/or the like). Other fabrics can thus be compared based on similar optical proprieties.

To confirm that a suitable shade fabric was selected and validate the brightness factor, a lighting designer, interior architect, or other professional may determine the impact of the window shade system on a particular room under various conditions. For example, they may obtain measurements related to the illuminance on the shade, walls and ceiling, the amount of light through the shade and glass, etc. to determine if the fabric selection was successful for optimizing daylighting and minimizing glare conditions. After obtaining a suitable window shade fabric based on the brightness factor of the present disclosure, lighting designers and interior architects may evaluate the level of window brightness and/or identify unusual glare or shadow conditions from adjacent buildings. For example, a north-facing window looking at a south-facing mirror facade often overheats the north elevation, and certain laws or ordinances may require the offending building to pay for the increase in energy.

Principles of the present disclosure may be utilized to interface with or share data with a shade control system, a daylighting control system, a daylight-brightness control system, a daylighting prediction program (e.g., a program configured to draw a room and calculate brightness areas; for example the "Radiance" software developed at Lawrence Berkeley National Laboratory), a building control system, and/or the like. Such systems may include automated shade systems that employ, for example, one or more algorithms to provide appropriate solar protection from direct solar penetration; predict an estimated amount of office illumination; reduction in solar heat gain; reduction in radiant surface temperatures (of the window wall); controlled penetration of the solar ray, optimization of the interior natural daylighting of a structure and optimization of the efficiency of interior lighting systems.

Moreover, principles of the present disclosure may suitably be combined with principles of automated shade control systems, for example as disclosed in U.S. Pat. No. 7,417,397 entitled "AUTOMATED SHADE CONTROL METHOD AND SYSTEM", U.S. Pat. No. 7,977,904 entitled "AUTOMATED SHADE CONTROL METHOD AND SYSTEM", U.S. Pat. No. 8,125,172 entitled "AUTOMATED SHADE CONTROL METHOD AND SYSTEM", and U.S. Pat. No. 8,120,292 entitled "AUTOMATED SHADE CONTROL REFLECTANCE MODULE", each of which have common ownership as the present application and are incorporated by reference in their entirety herein.

In an exemplary embodiment, such control systems may use the brightness factor information in programs in conjunction with, for example, the solar angles and brightness on the glass. This information may facilitate determining if it is or is not desirable to move the shades down past the position of the solar ray penetrating the window into the space of the shades because the calculations have determined that too much brightness will come in through the un-shaded window. In one embodiment, the various control systems control the shading system based on the solar position and override the brightness factor input (e.g., the brightness factor may be a secondary control factor). The control system adjusts the shading system to block out the sun, reflection, and/or the like; however, if the sun is not a concern at a particular time, then the control system may analyze the brightness factor to optimize the room conditions.

In various other exemplary embodiments, a brightness factor may be utilized by an automated shade control system in connection with a shadow module, a reflectance module, a proactive algorithm, a reactive algorithm, and/or any other suitable control component, program, and/or software. For example, in one embodiment an automated shade control system may utilize a shadow module configured to calculate the presence of one or more shadows on a building due to the surroundings of the building. Based on the shadow information from the shadow module, shade fabric having a particular brightness factor may be utilized for portions of the building. For example, if a portion of the building will be frequently in shadow, shade fabric having a higher brightness factor may be used as compared to portions of the building which will frequently be in sunlight.

In another exemplary embodiment, an automated shade control system may utilize a reflectance module configured to calculate the presence of one or more areas of reflected light on a building due to the surroundings of the building. Based on the reflectance information from the reflectance module, shade fabric having a particular brightness factor may be utilized for portions of the building. For example, if a portion of the building will be frequently subject to reflected light (e.g., from an adjacent building having a large reflective glass area), shade fabric having a lower brightness factor may be used as compared to portions of the building which will be less frequently subject to reflected illumination.

In various exemplary embodiments, a window covering comprising a shade fabric having a particular brightness factor may be positioned, aligned, tilted, retracted, extended, lowered, raised, and/or otherwise adjusted based at least in part on the brightness factor in order to desirably vary the brightness of a room. For example, a window covering having a high brightness factor may be lowered across a window responsive to darkened outdoor conditions in order to reflect a greater portion of light originating in the room back into the room. In another example, a window covering having a low brightness factor but high reflectance may be tilted in order to reflect a greater portion of light from the exterior of the room onto the ceiling of the room.

In yet another example, a window covering comprising multiple shade fabrics may deploy different shade fabrics responsive to changing external conditions, internal conditions, occupant behavior, and/or the like. For example, a first shade fabric having a low brightness factor may be lowered across a window responsive to direct sunlight falling on the window. As the sun moves or is obscured by clouds, direct sunlight may no longer fall upon the window, and the window covering may deploy a second shade fabric having a higher brightness factor in order to allow additional light from the outside into the room and/or reflect an increased portion of light originating in the room back into the room. Additionally, the window covering may deploy different shade fabrics having different brightness factors or other characteristics responsive to an occupant approaching a window, an activation of an emissive display, an activation of a projector, an opening of a door, an expiration of a timer, a rising and/or setting of the sun, and/or any other suitable event or occurrence.

The present disclosure facilitates improved modeling of the amount and/or quality of daylight. For example, when a building is designed from the inside to the outside, a user/owner may desire to obtain maximum daylighting which will impact the interior, and then impact the glazing and wall construction (e.g., curtain walls, punched windows, and/or the like). A brightness factor provides information to facilitate reducing or eliminating solar related glare and/or vision problems from the daylight. For example, the window shade system may eliminate the use of screen fabric, and instead, incorporate a translucent fabric.

One or more fabric properties may affect the brightness factor. For example, each fabric has one or more properties that are affected by color, density, thickness, yarn opacity and/or the like. These properties include, for example, fabric reflectance, fabric absorption, visible light transmission, visible light reflectance, visible light absorbance, visible light transmittance, visible light diffusion (which may or may not be fabric surface brightness and illumination values) and/or the like. Principles of the present disclosure may be used to qualify and/or quantify a brightness factor associated with various types of fabric under various conditions.

The color of the fabric may also affect the brightness factor. For example, a light fabric color with 2% openness will be very different from a light fabric with 5% openness; however, a dark fabric with 5% openness may be similar to a light fabric with 2% openness. The brightness factor and the color of the fabric may also be used to derive the amount of heat that may be radiated off the fabric. For example, a dark fabric with 0.9 emissivity and 90% absorption may allow additional long wave radiation to enter a room as compared to a light fabric with 0.9 emissivity and 10% absorption.

In accordance with an exemplary embodiment, one or more properties of a fabric used to determine a brightness factor may correspond to the color of the fabric. For example, a particular commercially available fabric may have associated Munsell color information and/or CIE xyY color information, such as color information published by the manufacturer or determined through third-party testing (e.g., information regarding the hue, value, and chroma of the fabric under the Munsell color system, information regarding the derived values x and y and the luminance Y under the CIE xyY color system, information for the L*, a*, and b* values under the CIELAB (CIE 1976) color space, and/or the like). For example, a particular fabric may have Munsell color information of 5P 5/10, with 5P indicating the color in the middle of the purple hue band, 5/ meaning a medium lightness value, and 10 indicating a chroma of 10. Another fabric may have CIE xyY color information of 0.1, 0.7, 50, indicating a greenish fabric with a luminance midway between black and white. Yet another fabric may have CIELAB color information of 80, 0, 0, indicating a light grey fabric. Moreover, any suitable color space may be utilized to determine a brightness factor, and the foregoing are by way of illustration and not of limitation.

In certain exemplary embodiments, the Munsell hue, value, and chroma of a particular fabric may be considered to correspond to certain factors utilized to determine a brightness factor of the fabric. In one exemplary embodiment, the Munsell hue corresponds to the diffusion factor, the Munsell value corresponds to the visible light reflectance, and the Munsell chroma corresponds to the openness factor. Any such correspondence between the Munsell hue, value, and/or chroma and factors used to determine a brightness factor of a fabric may be about 1:1; alternatively, the correspondence may be weighted to give additional consideration to one or more components of the Munsell color information.

In an exemplary embodiment, an estimated brightness factor for a particular fabric may be determined using the Munsell color information for that fabric. For example, an estimated brightness factor may be calculated as $$MEBF=[(MW1*CHROMA)+(MW2*VALUE)+(MW3*HUE)]*1000$$

of brightness or illuminance of the fabric, wherein:
MEBF=the estimated brightness factor of the fabric using Munsell information,
CHROMA=the Munsell chroma number of the fabric,
VALUE=the Munsell value number of the fabric,
HUE=the Munsell hue number of the fabric, and
MW1, MW2, and MW3=weighting factors corresponding to the relative contribution of each of the Munsell factors to the estimated brightness factor.

In an exemplary embodiment, the foregoing formula for calculating an estimated brightness factor utilizes a value for MW1 of between about 1 and about 100, a value for MW2 of between about 1 and about 100, and a value for MW3 of between about 1 and about 100.

In certain exemplary embodiments, the CIE x, y, and Y information for a particular fabric may be considered to correspond to certain factors utilized to determine a brightness factor of the fabric. In one exemplary embodiment, the CIE x value corresponds to the diffusion factor, the CIE Y value corresponds to the visible light reflectance, and the CIE y value corresponds to the openness factor. Any such correspondence between the CIE x, y, and/or Y values and factors used to determine a brightness factor of a fabric may be about 1:1; alternatively, the correspondence may be weighted to give additional consideration to one or more components of the CIE color information.

In an exemplary embodiment, an estimated brightness factor for a particular fabric may be determined using CIE xyY color information for that fabric. For example, an estimated brightness factor may be calculated as $$CEBF=[(CW1*x)+(CW2*y)+(CW3*Y)]*1000$$

of brightness or illuminance of the fabric, wherein:
CEBF=the estimated brightness factor of the fabric using CIE xyY information,
x=the CIE x value of the fabric in the CIE xyY color space,
y=the CIE y value of the fabric in the CIE xyY color space,
Y=the CIE Y value of the fabric in the CIE xyY color space, and
CW1, CW2, and CW3=weighting factors corresponding to the relative contribution of each of the CIE factors to the estimated brightness factor.

In an exemplary embodiment, the foregoing formula for calculating an estimated brightness factor utilizes a value for CW1 of between about 1 and about 100, a value for CW2 of between about 1 and about 100, and a value for CW3 of between about 1 and about 100.

By utilizing an estimated brightness factor, a particular shade fabric may be evaluated for suitability for use in a particular application without the need to resort to physical testing of the fabric. Although indexes of tested fabrics are contemplated by principles of the present disclosure, many thousands of shade fabrics exist, and a designer may desire to use a fabric which has not been subject to real-world testing in order to determine an associated brightness factor. However, the Munsell color information for the fabric may be available, and may be used to determine an estimated brightness factor as discussed hereinabove. By utilizing an estimated brightness factor, the designer may thus select an untested fabric with a reasonable level of confidence as to the resulting effect on the brightness of the associated shaded room.

The present disclosure is generally described with respect to shade fabrics, for example fabrics associated with roller shades. Additionally, principles of the present disclosure are applicable to non-roller shades, for example woven screen fabrics with a vinyl coating over a polyester or fiberglass substrate. However, one skilled in the art will appreciate that a brightness factor may be calculated for any type of window covering, for example, a translucent, transparent, cloth, cotton, polyester, rayon, nylon, linen, bamboo, wool, silk, satin, vinyl, thermoplastic olefin, polyolefin, fabrics, ThermoVeil® brand fabric (produced by MechoShade Systems, Inc. of New York), EuroVeil® brand fabric (produced by MechoShade Systems, Inc. of New York), EcoVeil® brand fabric (produced by MechoShade Systems, Inc. of New York), allied shade cloths, fabric coverings with and/or without low E coatings, mesh, mesh coverings, window slats, metallic coverings, and/or the like or any combinations thereof.

Principles of the present disclosure may also be used to facilitate the measurement of a brightness value of horizontal louvers, vertical blinds, adjustable louvers, panels, slats and Venetian type blinds, fixed or operable to varying angles of incidence to the solar ray. Typical louvers may not have a standard openness factor. Rather, louvers are more closed as the tilt angle increases, which may be considered an openness factor of the louvers. Louvers of a particular color and tilt angle (with the solar ray normal to the glass at a given angle) have varying degrees of brightness over the surface of the blind. The louvers may include resultant factors of louver reflectance, louver absorption, visible light transmission, visible light reflectance, visible light absorbance, visible light transmittance, visible light diffusion (which may or may not be louver surface brightness and illumination values) and/or the like. Principles of the present disclosure may be used to qualify and quantify a louver blind brightness factor associated with various types of louvers under various conditions, at specific tilt angles, and/or with a specific amount of light behind the blinds.

In various exemplary embodiments, a brightness factor for a shade fabric or other shade system may be determined via a brightness factor testing system. With reference now to FIG. 1, a test chamber 100 may be used to facilitate testing and/or validation of one or more window coverings. Test chamber 100 can be configured with one or more wall panels 102. In one embodiment, test chamber 100 includes a six-sided enclosure. Walls 102 can comprise any building material, including, for example polystyrene, plywood, drywall and the like.

In one embodiment, a front surface 104 of test chamber 100 has a substantially centered square opening 106, having a size of about 2 feet by 2 feet, for mounting one or more window coverings 110 and/or admitting solar radiation. A back surface 108 of test chamber 100 can be configured with one or more panels 102. In one embodiment, one window covering 110 is used and back surface 108 includes one panel 102. Panels 102, in turn, can be configured with mounting support 114 for an illuminance probe 116. Panels 102 may also be configured to be moveable in multiple directions (e.g., 1-6 directions) for facilitating adjustment of the distance of probe 116 to window covering 110, adjusting the relative angle of probe 116 to window covering 110 (adjustment of the angle may not be utilized in all validation procedures), and/or the like.

Test chamber 100 may be fixed for a particular validation procedure, but for other validation procedures, test chamber 100 may be configured in a variety of ways. For example, with reference to an exemplary embodiment depicted in FIG. 2, test chamber 200 comprises panels 202 and is mounted on a stand 220 configured for six degrees of freedom (i.e., x, y, z, yaw, pitch and/or roll). Stand 220 can facilitate adjustment due to changing solar angles throughout a day and/or a year. In one embodiment, a mirror is used to reflect light rays into the opening on front surface 104 and the mirror is adjustable to account for the apparent motion of the sun in the sky.

Figure 2:
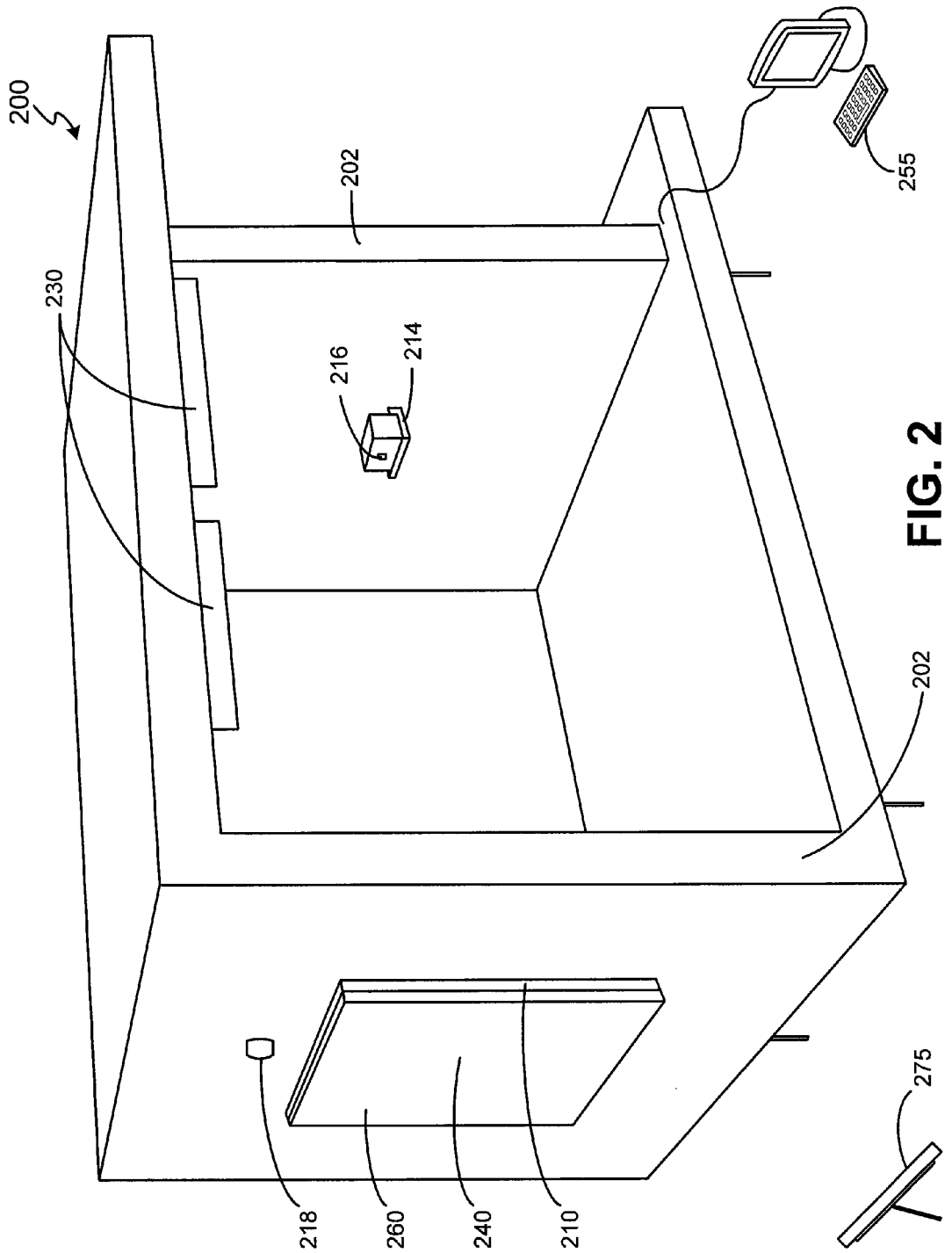
FIG. 2 illustrates an exemplary test chamber mounted on a stand in accordance with an exemplary embodiment.

The test chamber may also be painted to achieve a desired surface reflectance coefficient. With reference to FIG. 2, test chamber 200 may be painted in a variety of ways to facilitate fabric brightness testing. For example, in one embodiment, test chamber 200 is painted to achieve a desired surface reflection coefficient. In another embodiment, test chamber 200 is painted 50-50 gray to facilitate replication of ideal interior surface reflectivity conditions. In yet another embodiment, test chamber 200 is painted off-white to replicate typical office conditions.

The back of test chamber 200 is configured with a mounting support 214 for an illuminance probe 216. Illuminance probe 216 may be configured as any suitable type of illuminance probe, such as a Minolta™ or Tectronix™ narrow angle illuminance probe. Illuminance probe 216 is configured to take illuminance readings of window covering 210 surface from a distance. Illuminance probe 216 thus reduces measurement errors due to the effect of self-shading and/or higher reflectivity of illuminance probe 216.

Test chamber 200 is configured with one or more lights 230 to facilitate studying the effect of indoor lighting on the surface brightness of window covering 210. For example, test chamber 200 can be configured with two lamps 230 mounted in one or more positions within chamber 200. While two lamps 230 are depicted, any number of lamps can be used to model the interior lighting conditions of a building. Lamps 230 may comprise fluorescent bulbs, halogen bulbs, tungsten-filament bulbs, and/or any other type of light bulb or bulbs used for interior lighting. Window covering 210 test samples are mounted in any position within test chamber 200. In one exemplary embodiment, window covering 210 test samples are mounted on the inside of test chamber 200 in front of glazing 240.

In one embodiment, one or more diffusion filters 260 may be used to cover glazing 240 to provide a uniform light source. Diffusion filters 260 can be configured on any diffuse material, such as a glazing light with a white ceramic coating, or translucent and/or semi-translucent acrylic sheets, because acrylic has the ability to diffuse light evenly throughout a surface. Diffusion filters 260 may also be configured at any thickness to facilitate replication of overcast conditions. For example, in one embodiment, diffusion filter 260 is ⅛ inch thick. As a result, diffusion filter 260 acts as a secondary constant source.

A photometer 218 is mounted on a front surface panel 204 for facilitating recording the incident light level during the testing of window covering 210. Diffusion filters 260 may be placed in front of the glass when the light is too strong for the meter. Photometer 218 is configured as any suitable type of photometer, for example a Licor™ brand photometer. Photometer 218, in one embodiment, is placed in between diffusion filter 260 and glazing 240 to facilitate measuring the incoming solar radiation (light).

Test chamber 200 is configured to work with one or more computer simulation programs 255 to verify the results of the testing. Computer simulation programs 255 may include available commercial programs, for example Radiance and/or Lumen Micro.

Figure 3:
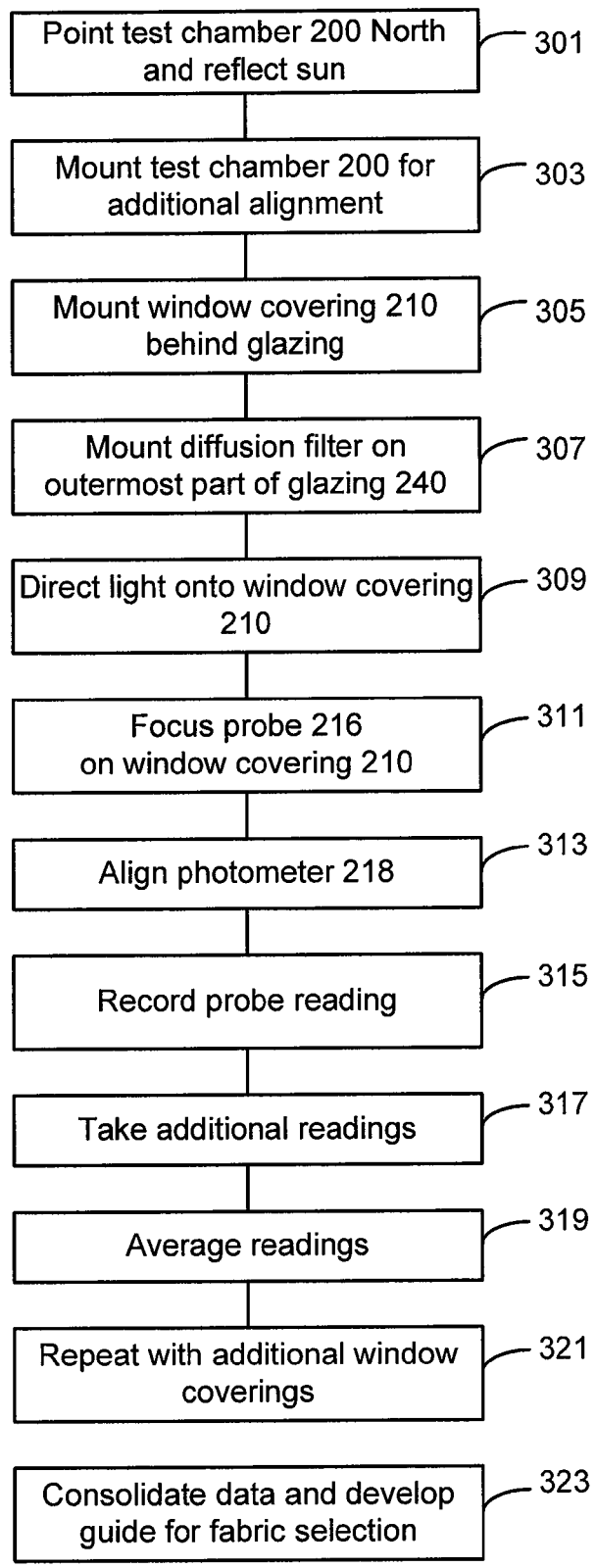
FIG. 3 illustrates an exemplary method for measuring an outside luminance value and/or an illuminance on an inside surface of a window covering in accordance with an exemplary embodiment.

Various methods for testing the surface brightness of window coverings 210 may be used. In one exemplary embodiment, and with reference to FIGS. 2 and 3, test chamber 200 is used to measure the outside luminance values and/or the illuminance of the inside window covering 210 surface. For example, test chamber 200 is first positioned facing north (step 301) in order to facilitate measurement of maximum daylighting. By pointing test chamber 200 to the north and using a mirror to reflect the light rays onto the face of the test chamber, front face 204 is aligned substantially perpendicular to the sun rays.

In another embodiment, if tilting and/or rotation of test chamber 200 does not result in test chamber 200 facing the sun at a substantially direct normal, test chamber 200 is mounted (step 303) for additional alignment. That is, test chamber 200 is mounted horizontal on a substantially level surface with front face 204 and window covering 210 facing north.

Next, window covering 210 to be tested is mounted flat behind glazing 240 (step 305). Window covering 210 may be mounted in a frame, and may be hung and/or mounted in any other manner. Because the time of day and/or the season affect the window covering 210, variations of the outside illumination levels can fluctuate. That is, though the amount of sunshine perceivable to the human eye is apparently constant for a given duration of time, the actual measured illumination levels differ significantly. Accordingly, one or more diffusion filters 260 are mounted (step 307) on the outermost part of glazing 240 and/or adjacent to window covering 210. Diffusion filter 260 is used to facilitate balancing the illuminance by diffusing the light. Diffusion filter 260 has its optical properties measured beforehand and thus, the illumination received inside test chamber 200 through diffusion filter 250 may be adjusted by a factor that accounts for the reduced light transmission from diffusion filter 260.

A mirror 275 is used to direct solar radiation (light) (step 309) onto the surface of window covering 210. Mirror 275 is configured to be any suitable size to facilitate directing a constant beam of light incident on the surface of window covering 210, thereby reducing any errors in the measurement solar radiation into test chamber 200. In one embodiment, mirror 275 is larger than the front panel opening. For example, in one embodiment, mirror 275 is configured to be approximately 4 feet by 4 feet. Mirror 275 is configured of any reflective type of surface, and in one embodiment, is configured to be substantially flat. In one exemplary embodiment, mirror 275 is a high quality flat mirror.

Next, illuminance probe 216 is focused on the center portion of window covering 210 (step 311) and initialized to record illuminance data. In order to measure a brightness value, photometer 218 is aligned and initialized to record the incident light behind diffusion filter 260 (step 313). A steady reading from illuminance probe 216 is recorded simultaneously with the reading from the photometer 218 (step 315). One or more additional readings are taken (step 317) to facilitate accurate measurements, as the measurements are averaged and processed in order to reduce measurement errors and determine an accurate brightness factor (step 319). The same procedure may be repeated to test additional window covering samples 210 (step 321).

Data obtained from testing may be consolidated in order to develop a guide for fabric selection based on one or more of luminance, illuminance of surface brightness, or the transmission factor of the glazing (step 323). For example, this data may be used to create a Shade Cloth Brightness Guide ("SCBG"). The SCBG may be used to provide a lighting consultant, interior architect/designer and/or building architect with the values they can utilize to select the desired fabric. The SCGB information may be combined with other interior design guides (for example, a guide for an openness factor), to facilitate optimization of an interior structure. In one embodiment, a customer may desire a certain color of fabric for his window coverings. In order to achieve a suitable interior brightness for the structure, the SCGB is consulted to determine the optimum density factor for the window coverings to achieve the desired interior brightness.

Once the data from photometer 218 and/or illuminance probe 216 has been recorded, the data can be processed and/or adjusted in order to determine a brightness value for window covering 210. For example, the data may be adjusted due to fluctuations from the incoming solar radiation (i.e., from cloud cover and/or the like). Further, adjustments may also be made for different types of glazing 240, interior reflectance coefficients, topography, ASHRAE sky models, geodesic coordinates of a building, actual and calculated solar position, actual and calculated solar angle, actual and calculated solar radiation, actual and calculated solar intensity, time, solar declination, solar altitude, solar azimuth, sky conditions, surface orientation of glazing 240, compass reading of glazing 240, the incidence angle of sun striking glazing 240, window covering 210 position, and/or the like.

The "standard" incident light level on a vertical may be calculated by converting the standard thermal value of 248.3 BTUs per hour per square foot to foot-candles (IP Units) and to lux (SI Units) by using a conversion value developed from the irradiation (thermal) and illumination (light) solar constants given in the Illuminating Engineering Society (IES) Handbook. The solar irradiation constant is 1,350 watts per square meter, or 427.9 BTUs per hour per square foot. The solar illumination constant is 128,000 lux or 11,891.6 foot-candles. Principles of the present disclosure may utilize a conversion value for converting BTUs per hour per square foot (total solar property) to an equivalent lighting level (visual property) using computer modeling analysis. Roller shade fabric luminance values may also be plotted (along with a trend line) as a function of a brightness factor, for glazing units with visible transmittance values ranging from, in one embodiment, 10% to 90%. The luminance values for shade fabrics alone (without glazing lites) may be determined by dividing the adjusted measured values by the visible light transmittances of each glazing lite that is mounted in front of the fabric samples.

During testing of fabrics, slight changes in the source radiation (light) may occur due to adjusting the reflecting mirror, etc. To compare fabrics, data may be based on an equal source radiation value. In one embodiment, the average inside wall surface measurement, the "behind fabric" measurement and the fabric surface measurement may all be "brought to unity" with an average outside light meter value. For example, the values may be adjusted to account for the small variation in the source solar (light) radiation. In one embodiment, the fabric test data measurements may be adjusted such that they are based on the average source light meter value. The true measured value is divided by the average values of the true measured values for a light source in order to obtain a multiplier. The multiplier may be used to normalize and adjust the original measured values of the glazing and fabric.

Figure 4:
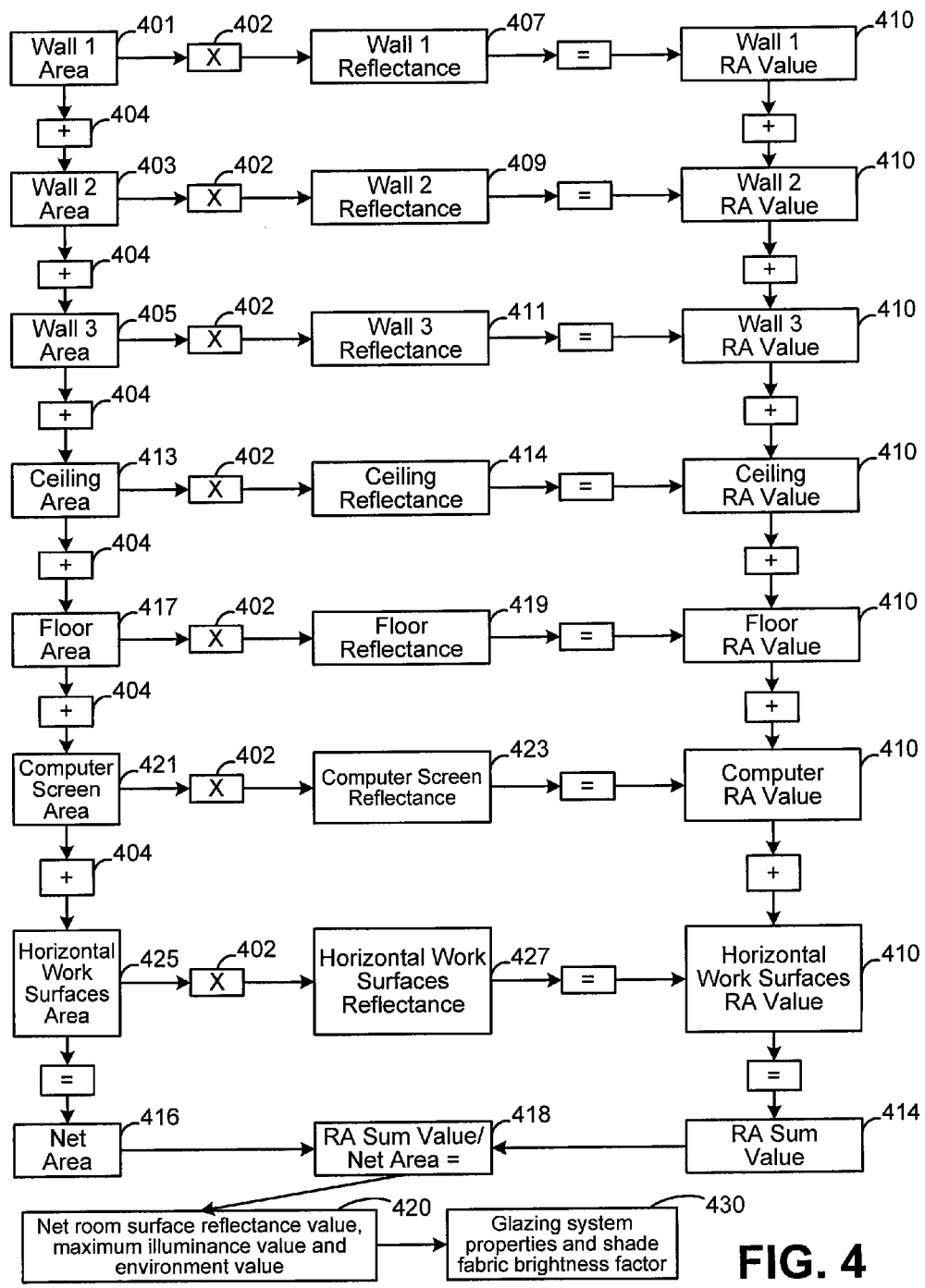
FIG. 4 illustrates an exemplary method for calculating a net room surface reflectance value in accordance with an exemplary embodiment.
Figure 5:
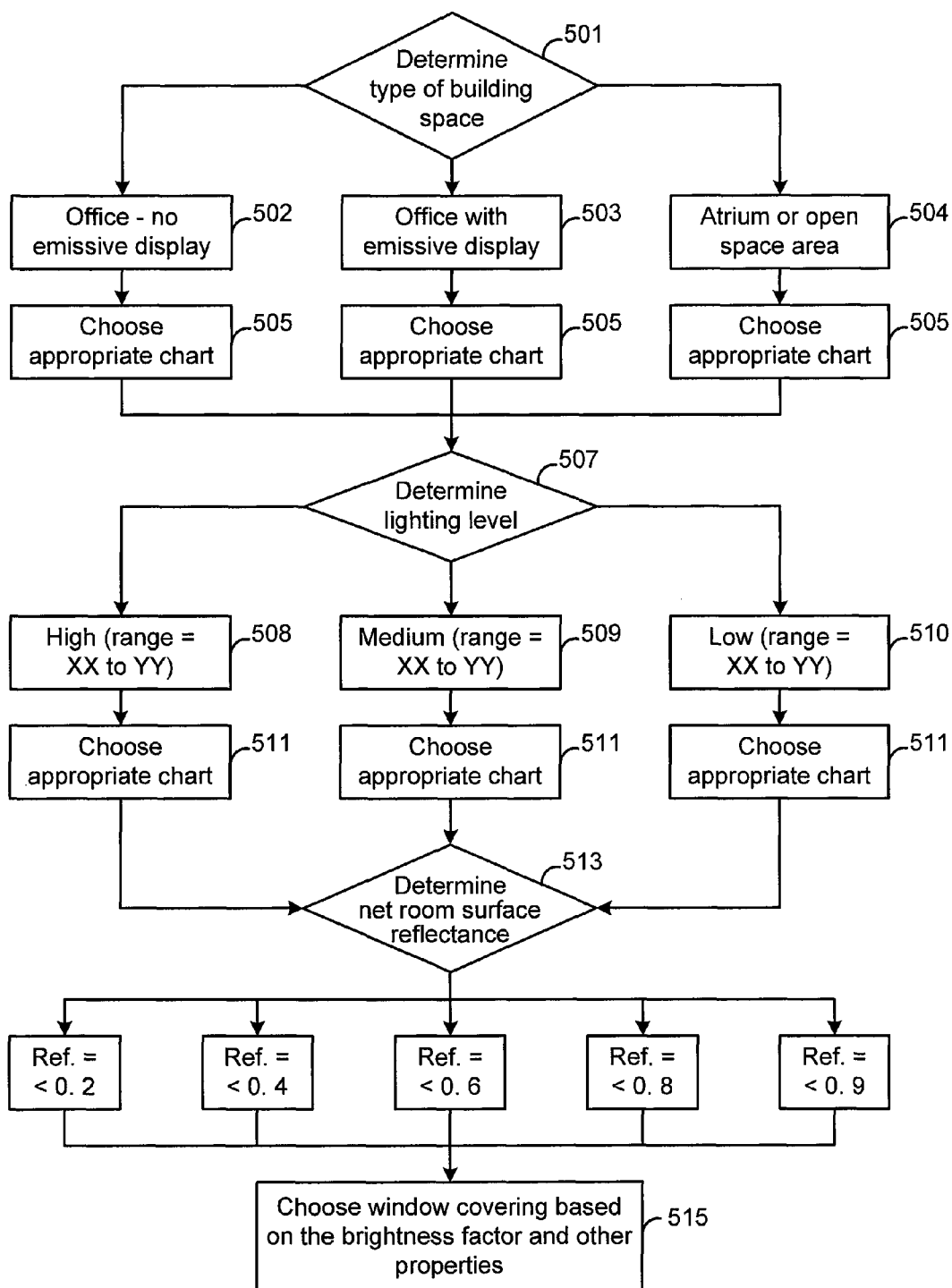
FIG. 5 illustrates an exemplary method for determining a desired shade surface brightness value in accordance with an exemplary embodiment.

A professional may consider the net room surface reflectance when selecting a fabric having a particular brightness factor. With reference to FIGS. 4 and 5, exemplary methods for calculating a net room surface reflectance value are provided. With reference to FIG. 4, an exemplary method for calculating the net room surface reflectance value is illustrated. This calculation includes considering one or more wall areas (steps 401, 403, 405), wall reflectances (steps 407, 409, 411), ceiling area and reflectance (steps 413 and 415), the floor area and reflectance (steps 417, 419), a computer screen area and reflectance (step 421, 423), and at least one horizontal work surface area and reflectance (step 425, 427). This will provide the general room area and reflectance values.

In one embodiment, the illuminance of an emissive display screen is used to determine a maximum illuminance acceptable with a window shading device under a particular acceptable brightness standard (for example, 10:1; however, other acceptable brightness standards may be utilized, e.g., 9:1, 12:1, and/or the like). While the maximum illuminance value may include the orb of the sun, in various exemplary embodiments, the orb of the sun is not included.

These room reflectance values are multiplied (steps 402) and/or added (steps 404) in order to find various reflectance areas (steps 410) and net areas (step 412). The sum of all the reflectance areas of the walls, ceiling and floor (step 414) are divided (step 418) by the total net area (step 416) to determine a maximum illuminance value and the environment value needed for the shaded window (step 420), which also determines one or more factors which may be utilized to select a fabric for the project based on the given parameters.

The amount of light penetrating into the room space is a factor of the visible properties of the glazing system and the shade fabric, if the shade is on the window. The glazing system visible properties and the shade fabric brightness value are considered when choosing the optimum roller shade fabric (step 430).

Once a threshold of brightness has been established, one or more fabric brightness factors suitable for the project are determined. The fabric brightness factor may be based on the type of room and the needs of the people within the room (i.e., based on the type of tasks or functions they are performing). For example, with reference now to FIG. 5, an exemplary method for selecting shade brightness factors comprises first determining the type of building space requirements based on occupant functionality because the needs often vary dramatically (step 501). By determining the type of building space requirements, a structure can be examined to determine if its requirements include an office (e.g., an office with no emissive displays (step 502), or an office with emissive displays (step 503)), an atrium or open space area (step 504), and relative brightness of the interior (e.g., walls, floor, ceiling, work surfaces and/or the like) to the brightness of the daylit window. While office spaces with and without emissive displays and/or atriums are depicted, other building spaces can be considered, for example lounges, conference rooms, executive areas, training areas, sleeping areas, lobbies, receptions, kitchens, dining areas, cafeteria, corridors in open plan, bathrooms, and/or the like.

A suitable chart is chosen for optimizing interior lighting (step 505). These charts may be predetermined based on the brightness factors, daylighting information, glare information, and/or the like described herein. For example, the amount of light penetrating into the room is affected by the visible light transmission of the glass, as well as the brightness and transmission of the shade and glass combination. Thus, different glass and shade combinations may be used to find a suitable brightness chart for optimizing interior illumination. The selection of a suitable brightness factor may depend upon the occupancy, architecture, space design, color of interior elements (floor, furniture, etc), and/or the like.

After a suitable chart is chosen, one or more desired lighting levels may be determined for the interior space (step 507). The desired lighting levels may include a high range (step 508), medium range (step 509), and/or a low range (step 510). Once a desired lighting level is determined, a second chart may be chosen to help determine the appropriate features needed to achieve the desired lighting level (step 511), as desired by professional lighting designers or other users. For example, the brightness factor for each fabric or the maximum brightness required for the interior occupancy may be considered in determining the appropriate features needed to achieve the desired lighting level. The net room surface reflectance may be calculated (step 513), so that a suitable window covering 210 is chosen (step 515) based on the brightness factor desired.

In accordance with another exemplary embodiment, a two-stage glare calculation is used to calculate and/or model the interior glare of an interior space. The first stage of the glare calculation computes the locations, sizes and brightness of one or more light sources and/or the background luminance level. The second stage glare calculation computes a desired glare index. One or more programs may be used to facilitate the glare calculation. For example, the Radiance Findglare program may be used to locate one or more glare sources and calculate the background levels (indirect vertical illuminances) for a specified view field. Various glare formula calculations may be used, for example, the Guth visual comfort probability, the International Commission on Illumination (CIE) glare index due to Einhorn, and/or the like. One or more programs or scripts may also be used to facilitate use of a glare program and/or formula calculations.

In various exemplary embodiments, an improved glare evaluation method is used to evaluate glare. The glare evaluation method includes both a standard monitoring protocol and advanced formulae. The equation used to calculate daylight glare is $$G = 0.48 \Sigma L_s^{1.6} \Omega^{0.8} / L_b + (0.07 \omega^{0.5} L_s)$$

Where:
$L_s$ is source luminance,
$L_b$ is background luminance,
$\omega$ is the solid angle sub tense of source at the eye, and
$\Omega$ is the solid angle sub tense of the source modified for the position of its elements in different parts of the field of view.

The parameters in this glare evaluation method include the window luminance (the source luminance), adaptation luminance (the luminance of the surroundings including reflections from the internal surfaces), and/or the exterior luminance (the luminance of the outdoors, caused by direct visible light, diffuse light from the sky and/or reflected light from the ground and other external surfaces).

In order to measure the daylight discomfort glare, one or more spot sensors (concentrated into a spot) are used to record continuous, automatic measurements of shielded and/or unshielded vertical illuminances. The vertical illuminances may be from the glazing luminance, the adaptation luminance and/or the exterior luminance, and the vertical illuminance can be derived and the daylight discomfort glare can be calculated. The sensors may be mounted vertically on a tripod according to the midpoint of the glazing looking at its center. The sensor arrangement is due to the illuminance distribution with the glazing plane being non-uniform, and therefore causes more glare than uniform light sources when positioned perpendicular to the line of sight. The glare sensation is largest at 0 degrees from the viewpoint.

In various exemplary embodiments, a brightness factor indicator may be utilized in connection with a fabric selection guide. For example, with reference now to FIG. 6, a particular fabric selection guide 600 may comprise entries corresponding to one or more characteristics of a shade fabric, for example a fabric identification value, a fabric name, a Munsell color number, and a brightness factor. The fabric selection guide may also be grouped, organized, and/or sorted based on a type of glazing. For example, a first type of glazing having about 60% to about 90% visible light transmittance may be associated with a first set of entries in the fabric selection guide. A second set of glazing having about 22% to about 30% visible light transmittance may be associated with a second set of entries in the fabric selection guide, and so forth.

Each set of entries in a fabric selection guide may be sorted and/or otherwise arranged based on a desired characteristic. For example, one set of entries may be sorted based on brightness factor in an ascending manner. Within the set, a group of fabrics having a recommended range of brightness factors may be identified. For example, a lower recommended bound 602 and an upper recommended bound 604 may be identified. Fabrics located between the lower recommended bound 602 and the upper recommended bound 604 may be deemed suitable for a particular application, for example in connection with a particular type of glazing. Thus, a user may quickly identify if a particular fabric may be unsuitable for a particular application due to a resulting low light condition (e.g., the fabric has a brightness factor which may be too low for a particular application), or unsuitable for a particular application due to an excessive brightness and/or glare issue (e.g., the fabric has a brightness factor which may be too high for a particular application).

Figure 7:
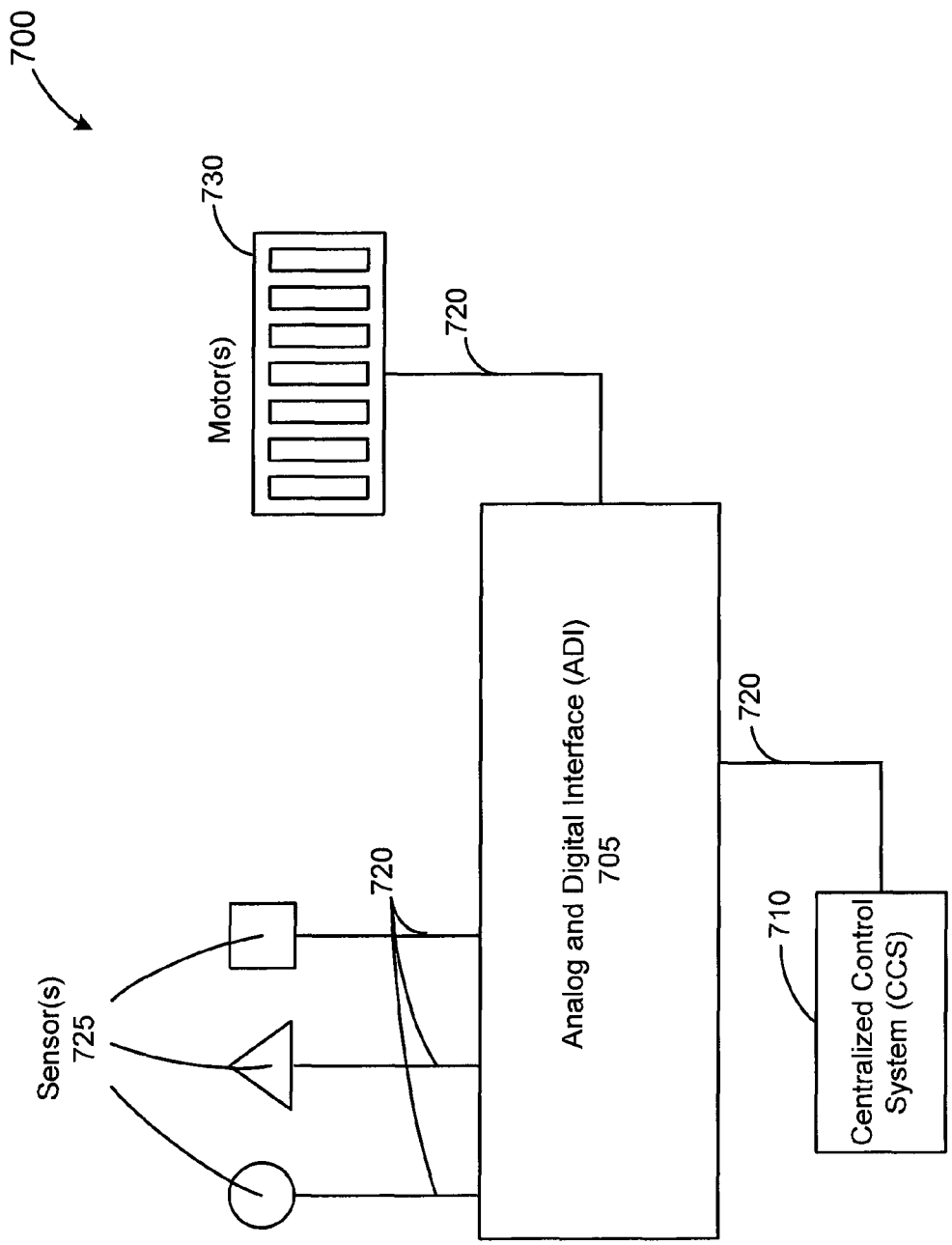
FIG. 7 illustrates an exemplary automated shade control system in accordance with an exemplary embodiment.

In various exemplary embodiments, and with reference now to FIG. 7, an automated shade control system (ASC) 700 comprise an analog and digital interface (ADI) 705 configured for communicating with centralized control system (CCS) 710, one or more motors 730 configured to move window coverings or other shade components, and one or more sensors 725. ADI 705 may communicate with CCS 710, motors 730, sensors 725 and/or any other components through communication links 720. ASC 700 may employ various control algorithms, for example proactive algorithms, reactive algorithms, and/or the like, and various overrides, for example brightness overrides, shadow overrides, reflectance overrides, thermal overrides, and/or the like, in order to govern the movement of motors 730 and the associated window coverings.

In various exemplary embodiments, proactive and/or reactive control algorithms may be used based on measured and/or calculated brightness. For example, centralized control system (CCS) 710 may be configured with one or more proactive and/or reactive control algorithms configured to measure and/or calculate the visible brightness on a window. Moreover, the proactive and/or reactive control algorithms may curve fit (e.g. regression analysis) measured radiation and/or solar heat gain in order to generate estimated and/or measured foot-candles on the glazing, foot-candles inside the glass, foot-candles inside the shade and class combination, and the like. Additionally, the proactive and/or reactive control algorithms may utilize lighting information, shadow information, radiation information, brightness information, reflectance information, solar heat gain, and/or any other appropriate factors to measure and/or calculate a total foot-candle load on a structure or a portion thereof Further, proactive and/or reactive control algorithms may be used and/or overridden based on measured and/or calculated thermal conditions, for example BTU loads on a window, glass, window covering, and/or the like. CCS 710 may be configured with one or more proactive and/or reactive control algorithms or overrides thereof configured to measure and/or calculate the BTU load on a window. Moreover, the proactive and/or reactive control algorithms or overrides thereof may take any appropriate action responsive to a measured and/or calculated BTU load, including, for example, generating a movement request to one or more analog and digital interfaces (ADIs) 705 and/or motors 730. For example, CCS 710 may generate a movement request to move a window covering into a first position in response to a measured load of 75 BTUs inside a window. CCS 710 may generate another movement request to move a window covering into a second position in response to a measured load of 125 BTUs inside a window. CCS 710 may generate yet another movement request to move a window covering into a third position responsive to a measured load of 250 BTUs inside a window, and so on. Additionally, CCS 710 may calculate the position of a window covering based on a measured and/or calculated BTU load on a window. Thus, CCS 710 may override a proactive algorithm responsive to a measured and/or calculated thermal condition, for example a BTU load on a window. Information regarding measured and/or calculated BTU loads, shade positions, and the like may be viewed on any suitable display device.

In various exemplary embodiments, CCS 710 may be configured with predefined BTU loads associated with positions of a window covering. For example, a "fully open" position of a window covering may be associated with a BTU load of 500 BTUs per square meter per hour. A "halfway open" position may be associated with a BTU load of 300 BTUs per square meter per hour. A "fully closed" position may be associated with a BTU load of 100 BTUs per square meter per hour. Any number of predefined BTU loads and/or window covering positions may be utilized. In this manner, CCS 710 may be configured to move one or more window coverings into various predefined positions in order to modify the intensity of the solar penetration and resulting BTU load on a structure.

Moreover, a minimum BTU load ("go"/"no-go") may additionally be employed in ASC 700 whereby movement of one or more window coverings may not commence unless the BTU load on the façade of a structure or a portion thereof is above a certain preset level.

Moreover, in certain exemplary embodiments, a programmable microcontroller of ASC 700 may be configured to utilize a limited data set in order to calculate one or more movements for a window shade. For example, ASC 700 may be configured to utilize one or more of ASHRAE algorithms, window geometry, window size, window tilt angle, height of the window head and sill off the floor, motor zone information, solar orientation, overhang information, window glazing specifications (i.e., shading coefficient, visible light transmission, and the like). ASC 700 may then calculate solar angles and/or solar intensity (i.e., in BTUs or watts per square meter) for each motor zone and/or solar penetration for each motor zone. Based on a measured and/or calculated sky condition, one or more window shades may then be moved to an appropriate position. ASC 700 may further utilize both shade movements resulting from real-time calculations (for example, calculations based on sensor readings) as well as scheduled shade movements.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical." When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. A method, comprising:
    determining, by a computer for determining an estimated brightness factor for a fabric, an estimated openness factor of the fabric based on a Munsell chroma of the fabric;
    determining, by the computer, an estimated visible light reflectance of the fabric based on a Munsell value of the fabric;
    determining, by the computer, an estimated diffusion factor of the fabric based on a Munsell hue of the fabric; and
    determining, by the computer, the estimated brightness factor based upon the estimated openness factor, the estimated visible light reflectance, and the estimated diffusion factor.

2. The method of claim 1, wherein the estimated openness factor is weighted by an estimated openness factor coefficient.

3. The method of claim 2, further comprising revising the estimated openness factor coefficient responsive to determining, using a light meter, a measured openness factor of the fabric.

4. The method of claim 1, wherein the estimated visible light reflectance is weighted by an estimated visible light reflectance coefficient.

5. The method of claim 4, further comprising revising the estimated visible light reflectance coefficient responsive to determining, using a light meter, a measured visible light reflectance of the fabric.

6. The method of claim 1, wherein the estimated diffusion factor is weighted by an estimated diffusion factor coefficient.

7. The method of claim 6, further comprising revising the estimated diffusion factor coefficient responsive to determining, using a light meter, a measured diffusion factor of the fabric.

8. The method of claim 1, wherein the determining the estimated brightness factor comprises:
 multiplying, by the computer, the estimated openness factor by an estimated openness factor coefficient to obtain a weighted estimated openness factor;
 multiplying, by the computer, the estimated visible light reflectance by an estimated visible light reflectance coefficient to obtain a weighted estimated visible light reflectance;
 multiplying, by the computer, the estimated diffusion factor by an estimated diffusion factor coefficient to obtain a weighted estimated diffusion factor; and
 summing, by the computer, the weighted estimated openness factor, the weighted estimated visible light reflectance, and the weighted estimated diffusion factor to obtain the estimated brightness factor.

9. A method of shading a room, the method comprising:
 selecting a shade fabric for use in constructing a window covering, wherein the shade fabric is selected based on a brightness factor of the shade fabric, and wherein the brightness factor is determined by measuring an openness factor, a visible light reflectance, and a diffusion factor of the shade fabric;
 placing the window covering between a window and a light source; and
 moving the window covering to modify the brightness in the room.

10. The method of claim 9, wherein the shade fabric is selected based on a brightness factor of the shade fabric exceeding a minimum recommended brightness factor, 11. The method of claim 9, wherein the shade fabric is selected based on a brightness factor of the shade fabric not exceeding a maximum recommended brightness factor.

12. The method of claim 9, wherein the shade fabric is selected based on the brightness factor not exceeding a brightness factor known to result in glare.

13. The method of claim 9, further comprising changing the shade fabric to a different shade fabric having a different brightness factor in order to modify the brightness in the room.

14. The method of claim 13, wherein changing the shade fabric comprises selecting a shade fabric with a lower brightness factor in response to visible light reflectance of surrounding items being increased.

15. The method of claim 13, wherein changing the shade fabric comprises selecting a shade fabric with a higher brightness factor in response to visible light reflectance of surrounding items being decreased.

16. The method of claim 13, wherein changing the shade fabric is in response to a change in color of an object in the room.

17. The method of claim 9, wherein moving the window covering comprises lowering the window covering to reflect a greater portion of light from the interior of the room back into the room.

18. The method of claim 9, wherein moving the window covering comprises aligning the window covering to reflect a greater portion of light from the exterior of the room onto the ceiling of the room.

19. The method of claim 9, wherein the shade fabric is selected based on at least one of glazing properties, room properties or environmental conditions.

20. The method of claim 9, further comprising integrating the brightness factor with at least one of a shade control system, a daylighting control system, a daylight-brightness control system, a daylighting prediction program, or a building control system.

21. The method of claim 9, further comprising integrating the brightness factor with at least one of a shade control system, daylighting control system, daylight-brightness control system, daylighting prediction program, or building control system such that said control system overrides data based upon said brightness factor.

22. The method of claim 9, wherein the selecting the shade fabric comprises utilizing a fabric selection guide having an upper recommended brightness bound and a lower recommended brightness bound.

23. A method, comprising:
 determining, by a computer for determining an estimated brightness factor for a fabric, an estimated openness factor of the fabric based on a first component of a color space associated with the color of the fabric;
 determining, h the computer, an estimated visible light reflectance of the fabric based on a second component of the color space;
 determining, by the computer, an estimated diffusion factor of the fabric based on a third component of the color space; and
 determining, by the computer, the estimated brightness factor based upon the estimated openness factor, the estimated visible light reflectance, and the estimated diffusion factor.

24. The method of claim 23, wherein the color space is at least one of the Munsell color space, the CIE xyY color space, or the CIELAB color space.

* * * * *